United States Patent Office 3,271,277
Patented Sept. 6, 1966

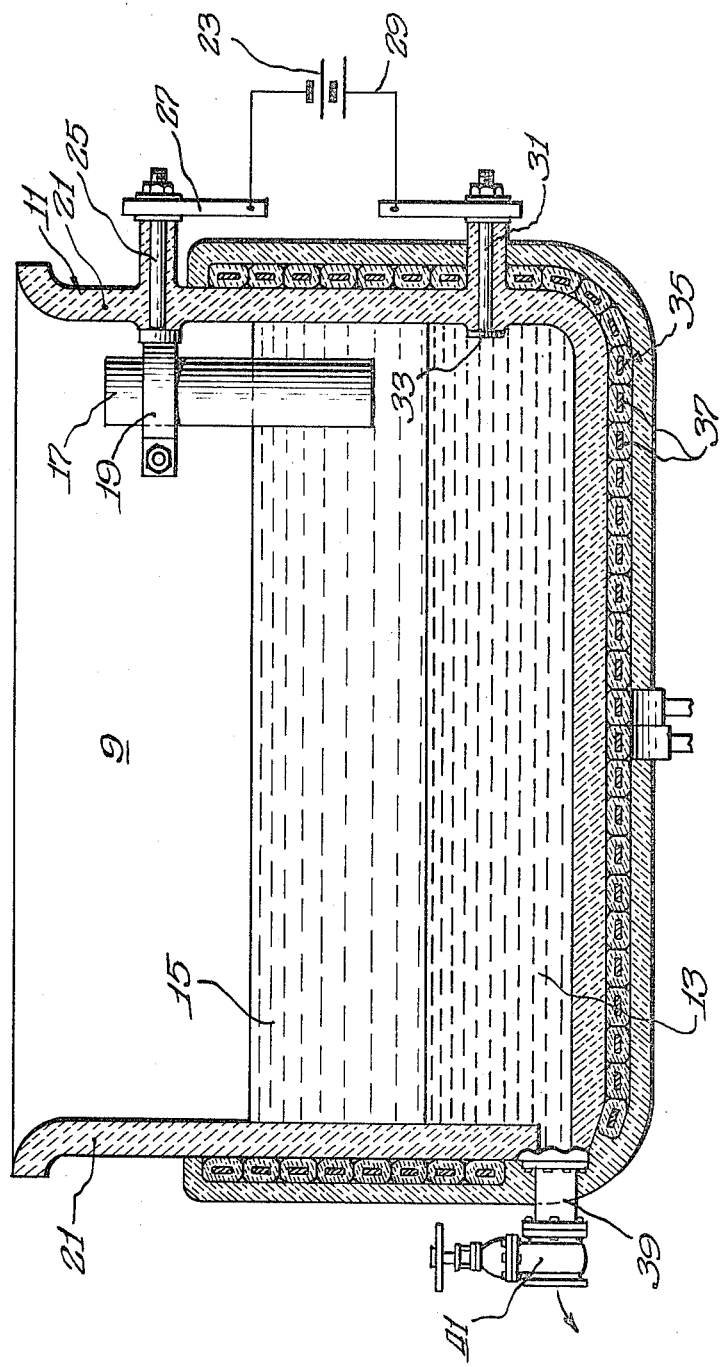

3,271,277
REFRACTORY METAL PRODUCTION
Leonard F. Yntema, R.R. 1, Box 9-A, Wadsworth, Ill.
Filed Apr. 30, 1962, Ser. No. 191,209
12 Claims. (Cl. 204—64)

The present invention generally relates to refractory metals and more particularly relates to improved means for the production of refractory metals, such as columbium and tantalum, in purified form.

Refractory metals presently have important uses in a variety of high temperature applications, such as in jet engine after-burners, missiles and in other components wherein materials of high structural strength and high temperature stability are required. Considerable research is being directed to further applications of such metals to space programs and the like. For some commercial and research purposes it is desirable to be able to produce refractory metals in as purified a form as possible, utilizing as simple and inexpensive a procedure as possible. In view of the relatively high manufacturing costs involved, it is also important to provide a process which results in high yields of the metal from oxide starting materials.

Various processes have been developed for the reduction of refractory metal oxides, but have been largely complicated by the relatively high melting points of the refractory metals and by their reactivites with certain materials. Processes that yield refractory metals in the molten state ordinarily require very high heating temperatures and meet with technical difficulties in the selection of materials for containment of the reaction products in providing sufficient heat insulation to allow the necessary reactions to take place relatively economically. Procedures whereby refractory metals are placed in the molten form and then purified have been found to be useful but, for a number of reasons, comparable procedures have been found to be generally unsuitable for reduction of the refractory oxides to the purified metallic state.

Thus, procedures currently employed for the production of refractory metals include reaction of the oxides or carbides at high temperature in a vacuum, or the reaction of the halides with an active metal. The products of these operations are usually contaminated to such an extent that sintering or melting under specialized conditions is necessary to remove a substantial proportion of the contaminants therefrom, including metalloids, carbon, oxygen, nitrogen and the like. Moreover, when reduction of the oxide by active metal or when electrolysis of the oxide in a fused halide bath is employed, the product is a powder which must then be subjected to extensive leaching and washing operations in order to insure sufficient removal therefrom of salts and other compounds, including by-products of the active metal reduction or components of the electrolysis bath.

Accordingly, existing processes for the production of refractory metals are subject to a number of difficulties. Some of such processes are only operable at very high temperatures and substantially all of the processes require a complicated series of steps, including end procedures for freeing the metal product from substantial concentrations of impurities.

Now, however, there has been discovered a simple effective method whereby refractory metals in high yield can be produced in purified form from their oxides at relatively low temperatures. The method has only a limited number of relatively simple steps, and can be carried out with relatively simple equipment. Moreover, the method is readily adapted to continuous, and therefor economical, operation on a small or large scale. Moreover, improved apparatus is provided wherein steps of the method of the present invention can be effectively carried out. The method and apparatus are particularly effective in the production of such refractory metals as columbium and tantalum.

Accordingly, the principal object of the present invention is to provide means for producing refractory metals in purified forms from their oxides. It is a further object of the present invention to provide a method of economically producing purified refractory metal in high yield. It is also an object of the present invention to provide improved apparatus in which the steps of the present method can be effectively carried out. It is a still further object of the present invention to provide a method of producing refractory metal, which method has a limited number of steps and involves the reduction of refractory oxides, such as columbium oxide or tantalum oxide at a relatively low temperature in simplified apparatus.

Further objects and advantages of the present invention will be apparent from the study of the following detailed description and of the accompanying drawings of which:

The single figure is a vertical section of the preferred embodiment of apparatus of the present invention wherein the reduction of refractory oxides in accordance with the method of the present invention can be conveniently carried out.

The present invention generally comprises improved means for effecting electrolytic reduction of refractory oxides to the metallic form at relatively low temperatures and for the recovery of the metal so produced in a form which allows its further purification in a simple effective manner.

More particularly, the present invention includes an improved electrolytic method and electrolytic apparatus for practicing the method of reducing refractory oxides to purified metal at relatively low temperature utilizing a liquid metal cathode, a fused halide electrolyte and a replaceable solid anode. The method is characterized by recovery of the refractory metal in the metallic cathode and separation therefrom by suitable means which assure a highly purified final product.

Thus, refractory metal oxide is dissolved in molten halide electrolyte in an electrolysis zone, then reduced to the desired refractory metal which is deposited in the molten cathode metal and removed therewith. The molten cathode metal is then separated from the refractory metal, which can be further purified if desired, or utilized in the so recovered form.

Now considering the steps of the method of the present invention more particularly, refractory metal oxide, such as columbium oxide in the pentoxide or other oxide form, or tantalum oxide in the pentoxide or other oxide form, or any one or mixture of oxides of any one of the other refractory metals, such as vanadium, titanium, zirconium, hafnium, thorium, or beryllium, is placed in solution in a fused alkali halide electrolyte in an electrolysis cell. Such a cell is preferably constructed as illustrated in the single figure of the accompanying drawing and includes, besides the electrolyte, a replaceable solid anode and a metallic cathode. Now referring to the accompanying figure, an electrolytic cell 9 is illustrated comprising a vessel 11, which can be fabricated of any suitable material having sufficiently high temperature stability to withstand an operating temperature of about 500° C. The vessel 11 should also be non-reactive with the electrolytic constituents and with the material being treated. Vessel 11 is preferably constructed of a ceramic material and more preferably, a high temperature glass so that the reaction taking place within the vessel can be visually observed. The vessel may be of any desired size or shape, for example an open topped cylinder or the like.

A metal cathode 13 for the cell is provided, which cathode during electrolysis is in liquid form. Accordingly, it is desirable and convenient to dispose the cathode 13 as a separate bottom layer, as shown in the accompanying figure, within the vessel 11. Cathode 13 may comprise any suitable metal having a relatively low melting point, that is, well below that of the refractory metal to be produced during the electrolytic reaction. The cathode must also have an extremely low or negligible mutual solubility and reactivity with the refractory metal being produced, a low vapor pressure at the electrolytic treating temperature (i.e., with the cathode in liquid or molten form) and nonreactivity with the electrolyte 15 of the cell. For such purposes, cadmium, zinc and similar low melting point metals can be used as the cathode, the particular metal being selected on the described basis, in view of the particular refractory metal to be produced in the process.

The electrolyte 15, as previously indicated, comprises one or more low melting point alkali halides, molten at the electrolytic operating temperature and nonreactive with both the refractory metal and the cathode. Such electrolyte 15 may comprise, for example, one or any suitable mixture of the following: potassium fluoride, sodium fluoride, lithium fluoride, potassium chloride, sodium chloride or lithium chloride. Other suitable alkali halides can also be utilized. During the electrolysis the electrolyte is in liquid form and is disposed, as indicated in the accompanying figure, between the cathode and anode 17. The electrolyte 15 is conveniently disposed as a separate layer on, but having no reactivity, solubility or miscibility with the lower cathode 13 layer in cell 9.

The anode 17 may be constructed of any suitable material. Preferably, the anode is carbon or graphite. The anode must not be soluble in or reactive with the electrolyte. During the electrolysis, the anode 17 is converted into an oxide form and, in the case of carbon and graphite, vaporizes and passes from the cell so that periodic replacement thereof is required. The anode is preferably releasably secured in contact with the electrolyte 15, as by a bracket 19, in turn secured to the side wall 21 of vessel 11 and is electrically interconnected with an external direct current source 23, diagrammatically illustrated in the single figure; and thus, bracket 19 may be electrically conductive metal and connected to an electrical lead 25 secured to lead 27 external of vessel 11, lead 27 running to the current source 23. The latter is, in turn, connected through leads 29 and 31 to the cathode, a contact plate 33 preferably being provided within the cell, as shown in the accompanying figure, fabricated of high temperature metal, solid at the electrolysis temperature.

The oxide of the refractory metal to be produced in accordance with the present method, is, as previously indicated, introduced into the electrolyte in the treating zone, that is, in the cell 9 after the cell has been heated to a point sufficiently high to liquify the electrolyte. The oxide is preferably in finely divided powder form to facilitate its solution in the electrolyte. In order to heat the cell, any suitable heating means may be employed, for example, an electrical resistance heating unit 35 which, as shown in the accompanying figure, may comprise a suitable metallic conductor 37 wrapped around the outside of vessel 11 and connnected to a suitable current supply (not shown).

The cell is heated to electrolysis temperature, for example, a temperature generally within the range of from about 500° C. to about 700° C. Such temperature should be sufficiently high to convert the cathode to molten form, liquify the electrolyte and cause the solution of the refractory oxide in the electrolyte. The refractory oxide is added to the molten electrolyte at any suitable temperature up to electrolysis temperature, and preferably in a concentration at least sufficient to saturate the electrolyte. More preferably, an excess amount of refractory oxide is added to electrolyte, so that as electrolysis proceeds and already dissolved refractory oxide is decomposed, the excess refractory oxide will enter solution in the electrolyte.

The anode is moved down into contact with the electrolyte and electrolysis is initiated. The dissolved refractory oxide reacts with the anode, converting the anode into oxide (carbon oxide) with reduction of the refractory oxide into refractory metal. The refractory metal is attracted to the cathode, passes the interface between the liquid electrolyte and the liquid cathode and enters the cathode. Refractory metal, as it is formed during the electrolysis, continues to pass into the cathode. Further amounts of refractory oxide can be added to the molten electrolyte during the electrolysis. A rise in voltage in the cell 9 is an indication that the electrolyte has been depleted of formed refractory metal by migration of the formed refractory metal into the cathode, and that more refractory oxide should be added to the electrolyte. During electrolysis, whenever the cathode becomes viscous due to a high concentration of refractory metal particles dispersed therein, a portion of the cathode can be removed from the cell as, for example, by a ladle or the like, but preferably by withdrawal from the cell through a suitable outlet, for example, line 39 and valve 41, as shown in the accompanying single figure. Fresh solid or molten cathode metal can then be introduced into the cell in any suitable manner to replace the refractory metal-laden cathode metal withdrawn from the cell. In this connection, solid or molten cathode metal can simply be dropped from the top of the cell down through the electrolyte layer. Alternatively, fresh molten cathode metal can be pumped into the cathode layer through a suitable line (not shown) or the like.

It will be readily understood that the described electrolysis can be carried out on a batch, intermittent or continuous basis, and is particularly well adapted for continuous operation, with periodic or continuous withdrawal of a portion of the cathode molten metal and replacement thereof with fresh cathode metal. Moreover, periodic replacement of the anode can be effected as it is used up during oxidation thereof.

The cathode metal laden with dispersed refractory metal formed during electrolysis and deposited therein is then treated, in accordance with the present method, to separate the cathode metal from the refractory metal. Since the cathode metal has a very low or negligible mutual solubility with the refractory metal, separation thereof from the refractory metal is relatively simple. For example, the molten cathode metal containing the refractory metal can be passed to a heating zone and can be heated therein in a vacuum to above the vaporization point of the cathode metal but below the melting point of the refractory metal. For example, when the dispersed refractory metal is columbium and the cathode is cadmium, they can be heated up in a vacuum, for example, of less than one micron pressure, to about 700° C. as in a furnace. The cadmium substantially completely vaporizes off at 700° C. and can be trapped separately in a cold zone in the furnace or supplementary equipment for reuse in the electrolytic cell. Essentially none of the columbium vaporizes at 700° C. but remains behind in the furnace hot zone in purified powder or crystalline form. Such powder can be used per se, i.e., can be converted to a desired end product by compacting it, as by melting or sintering, utilizing conventional sintering or melting techniques. It can also, if desired, be further purified of any traces of the cathode metal, for example, as by arc melting. One particularly efficient technique for removal of trace elements from the refractory metal employs conventional electron beam melting apparatus, operating, however, at a high vacuum, preferably less than 0.1 micron pressure.

It will be understood that the columbium powder or other refractory metal powder recovered by separation from the cathode metal in the described heating zone is already in highly purified form and could be used without such subsequent treating step.

Example I

An electrolysis cell is constructed from a temperature resistant open topped glass cylinder having the following approximate dimensions: 10 inches in diameter, 15 inches in height. The glass vessel is surrounded by a resistance heating coil electrically connected to a current source. The vessel has disposed therewithin a bottom layer, approximately 3 inches thick, of cadmium metal, over which is disposed a layer of electrolyte, approximately 6 inches thick and made up of a mixture of potassium fluoride and sodium fluoride. A graphite anode is disposed above the surface of the electrolyte and leads are provided from the anode through an external circuit and back to the cathode to electrically interconnect the cathode and anode.

The cell is resistance heated to an operating temperature of approximately 500° C., at which time both the electrolyte and the cathode are in liquid form as separate immiscible superposed layers in the vessel. The anode is then adjusted so that it projects down into the liquid electrolyte for good contact therewith. The electrolyte is then supersaturated with columbium oxide powder, that is, the oxide powder is sprinkled down into the electrolyte until the electrolyte is saturated therewith and then a small excess of the columbium oxide is added to the electrolyte. In this regard, approximately 5 pounds of columbium oxide are initially added to the electrolyte which is initially in a concentration of approximately 43 pounds. The cathode is in a concentration of about 72 pounds.

Electrolysis is thus initiated with the oxidation-reduction reaction resulting in evolution of carbon oxide at the anode and the production of columbium metal within the electrolyte, i.e., an oxidation-reduction reaction. The electrolysis is followed by periodically measuring the voltage drop across the cell. A rise in voltage indicated depletion of the electrolyte of columbium, whereupon additional columbium oxide powder is added to the electrolyte.

The cadmium pool gradually becomes more viscous and a portion of the cadmium cathode pool is periodically withdrawn from the cell through an outlet line. The withdrawn molten cadmium is replaced by solid cadmium, dropped down through the electrolyte layer into the cadmium pool. Accordingly, the process is operated on a continuous basis, the anode also being periodically replaced when nearly used up (by oxidation thereof into carbon oxides by reduction of the columbium oxide).

Batches of the withdrawn columbium-containing molten cadimum cathode are passed to a vacuum furnace and therein heated in a vacuum of about 1 micron pressure to approximately 700° C., the cadimum evoporating from the columbium and being trapped in a separate cold zone for re-addition to the electrolysis cell in liquid or solid form.

When the cadmium is substantially completely removed from the columbium in each batch so treated in the vacuum furnace, the columbium in powder form remaining in the hot zone of the furnace is removed therefrom. It has a cadmium content of less than 0.001 percent by weight. It is then subjected to arc melting at about 2000° C., i.e., above the melting point thereof, to remove trace amounts of cadmium which may be present in the columbium powder and to provide the columbium in a form of substantial size. The molten purified columbium is then allowed to cool to ambient temperature.

Example II

Electrolysis of tantalum pentoxide is carried out generally according to the method set forth in Example I. However, the electrolysis, in contrast to that of Example I, is carried out on a batch, not a continuous basis. Moreover, zinc metal is used as the cathode in place of cadmium and a mixture of sodium fluoride and sodium chloride (804° C. melting point) is employed as the electrolyte. The separation of the zinc cathode metal from tantalum metal particles dispersed therein is carried out, as set forth in Example I, in a vacuum furnace but at about 900° C. to provide as a residue tantalum metal powder containing not more than about 0.001 percent, by weight, of zinc. The purified recovered zinc is re-utilizable for a subsequent batch in the electrolysis cell.

The tantalum metal powder is further purified to remove any trace of zinc therefrom by heating to above the melting point thereof, but below the vaporization point thereof and above the vaporization point of the zinc, for example, to about 3000° C. in an electron bombardment re-melting apparatus under a vacuum of less than 0.01 micron pressure. Molten tantalum free of all traces of zinc and other contaminants is obtained by such final treatment step. The molten tantalum is cooled to ambient temperature to provide as the final product, solid pure tantalum suitable for use in commercial and research applications.

Examples I and II above are illustrative of the method of the present invention and the electrolysis cell of the invention. It will be, for example, understood that a zinc cathode can be used in preparing columbuim and a cadmium cathode in preparaing tantalum. Moreover, both the method and the cell are equally suitable for use in the production of purified refractory metals in addition to columbium and tantalum. The present method is simple, effective, operates at a relatively low temperature and provides high yields of purified refractory metal. It avoids various difficulties, as previously described, with conventional refractory metal oxide reducing processes and involves a minimal amount of steps, constituents and apparatus. Metalloid contaminants are avoided, as are complicated leaching and washing operations which increase the probability of loss of product. The electrolyte cell utilized in the oxidation-reduction step in accordance with the method is efficient and suitable for batch or continuous production of the refractory metal. Other advantages of the present invention are set forth in the foregoing.

Various of the features of the present invention are set forth in the appended claims.

What I claim is:

1. An electrolytic process for the production of purified refractory metals, which process comprises the steps of dissolving a refractory metal oxide in a molten alkali halide electrolyte in an electrolysis zone maintained at an electrolysis temperature between about 500° C. and about 700° C., reducing said oxide in said electrolysis zone at said electrolysis temperature to the corresponding refractory metal, depositing said refractory metal in particulate form into a molten metal cathode in said zone, and separating said particulate refractory metal from said cathode by distilling off said cathode metal, said cathode metal comprising metal other than mercury having a negligible mutual solubility with said refractory metal and said molten electrolyte, said cathode metal having a low vaporization point at said electrolysis temperature and having a melting point substantially below that of said refractory metal.

2. The process of claim 1, wherein said refractory metal oxide is columbium oxide.

3. The process of claim 1, wherein said refractory metal oxide is tantalum oxide.

4. An electrolytic process for the continuous production of purified refractory metals, which process comprises continuously dissolving a refractory metal oxide in a molten alkali halide electrolyte in an electrolysis zone maintained at an electrolysis temperature between about 500° C. and about 700° C., continuously reducing a portion of the dissolved refractory oxide in said electrolysis zone at said electrolysis temperature to the corresponding refractory metal, continuously depositing said formed refractory metal in particulate form into a molten metal cathode in said zone, at least periodically removing a portion of said cathode metal from said zone, separating said particulate refractory metal from said cathode metal by distilling off said cathode metal and returning a compensating amount of refractory metal-free cathode metal to said cathode in said zone, said cathode metal comprising metal other than mercury having a negligible mutual solubility with said refractory metal and said molten electrolyte, a low vaporization point at said electrolysis temperature and a melting point substantially below that of said refractory metal.

5. The process of claim 4, wherein said refractory metal oxide is columbium oxide and wherein said cathode metal comprises cadmium.

6. The process of claim 4, wherein said refractory metal oxide is tantalum oxide and wherein said cathode metal comprises zinc.

7. An electrolytic process for the production of purified refractory metals, which process comprises the steps of dissolving a refractory metal oxide in a molten alkali halide electrolyte in an electrolysis zone maintained at an electrolysis temperature between about 500° C. and about 700° C., reducing said oxide in said electrolysis zone at said electrolysis temperature to the corresponding refractory metal, depositing said refractory metal in particulate form into a molten metal cathode in said zone, separating said particulate refractory metal from said cathode metal, said cathode metal comprising metal other than mercury having a negligible mutual solubility with said refractory metal and said molten electrolyte, a low vaporization point at said electrolysis temperature and a melting point substantially below said refractory metal, and thereafter removing by distillation, trace impurities from said refractory metal by heating said refractory metal to above the melting point thereof but below the vaporization point thereof in a vacuum.

8. The process of claim 7, wherein said refractory metal oxide is columbium oxide.

9. The process of claim 7, wherein said refractory metal oxide is tantalum oxide.

10. An electrolytic process for the production of purified refractory metals, which process comprises the steps of dissolving a refractory metal oxide in a molten alkali halide electrolyte in an electrolysis zone maintained at an electrolysis temperature between about 500° C. and about 700° C., reducing said oxide in said electrolysis zone at said electrolysis temperature to the corresponding refractory metal, depositing said refractory metal in particulate form into a molten metal cathode in said zone, separating said particulate refractory metal from said cathode metal by distilling off said cathode metal, said cathode metal comprising metal other than mercury having at most a negligible mutual solubility with said refractory metal and said molten electrolyte, a low vaporization point at said electrolysis temperature and a melting point substantially below that of said refractory metal, and thereafter removing by distillation trace impurities from said refractory metal by heating said refractory metal to above the melting point thereof but below the vaporization point thereof in a vacuum.

11. The process of claim 10, wherein said refractory metal oxide is columbium oxide and wherein said cathode metal comprises cadmium.

12. The process of claim 10, wherein said refractory metal oxide is tantalum oxide and wherein said cathode metal comprises zinc.

References Cited by the Examiner

UNITED STATES PATENTS

| | | | |
|---|---|---|---|
| 1,782,616 | 11/1930 | Hulin | 204—243 |
| 2,757,135 | 7/1956 | Gleave et al. | 204—64 |
| 2,866,743 | 12/1958 | Schmitt | 204—243 |
| 2,913,379 | 11/1959 | Steinberg | 204—64 |
| 2,951,793 | 9/1960 | Hansen | 204—64 |
| 2,987,454 | 6/1961 | Kopelman et al. | 204—65 |
| 3,002,906 | 10/1961 | Ervin et al. | 204—64 |
| 3,087,873 | 4/1963 | Slatin | 204—64 |
| 3,206,385 | 9/1965 | Meiklejohn et al. | 204—64 |

JOHN H. MACK, *Primary Examiner.*

JOHN R. SPECK, *Examiner.*

B. JOHNSON, H. S. WILLIAMS, *Assistant Examiners.*